(12) United States Patent
Körner et al.

(10) Patent No.: US 7,800,443 B2
(45) Date of Patent: Sep. 21, 2010

(54) CIRCUIT ARRANGEMENT FOR PROVIDING AN ANALOG SIGNAL, AND ELECTRONIC APPARATUS

(75) Inventors: Peter Körner, Lund (SE); Kaj Ullén, Bjärred (SE)

(73) Assignee: Sony Ericsson Mobile Communications AB, Lund (SE)

( * ) Notice: Subject to any disclaimer, the term of this patent is extended or adjusted under 35 U.S.C. 154(b) by 19 days.

(21) Appl. No.: 12/266,894

(22) Filed: Nov. 7, 2008

(65) Prior Publication Data

US 2010/0073091 A1  Mar. 25, 2010

Related U.S. Application Data

(60) Provisional application No. 61/099,660, filed on Sep. 24, 2008.

(51) Int. Cl.
 *H03F 1/00* (2006.01)
(52) U.S. Cl. .................................. 330/174; 330/250
(58) Field of Classification Search ............ 330/174, 330/285, 296, 250
See application file for complete search history.

(56) References Cited

U.S. PATENT DOCUMENTS

| | | | | |
|---|---|---|---|---|
| 2,742,615 A | * | 4/1956 | Preisig | 333/187 |
| 3,626,309 A | * | 12/1971 | Knowles | 329/328 |
| 4,268,807 A | * | 5/1981 | Spence | 333/191 |
| 5,446,415 A | * | 8/1995 | Kirisawa | 330/302 |
| 6,052,603 A | | 4/2000 | Kinzalow et al. | |
| 6,580,797 B1 | | 6/2003 | Papadopoulos et al. | |
| 6,842,525 B1 | | 1/2005 | Mellot | |
| 6,978,029 B1 | | 12/2005 | Ikeda | |
| 7,505,600 B2 | * | 3/2009 | Dryer | 381/111 |
| 2004/0208327 A1 | | 10/2004 | Henson et al. | |
| 2006/0147061 A1 | | 7/2006 | Niwa et al. | |
| 2007/0297623 A1 | | 12/2007 | Kuiri | |
| 2008/0164888 A1 | | 7/2008 | Suzuki et al. | |
| 2008/0166001 A1 | | 7/2008 | Hankey et al. | |

FOREIGN PATENT DOCUMENTS

| | | |
|---|---|---|
| EP | 0 546 571 | 6/1993 |
| EP | 0 738 047 | 10/1996 |
| EP | 1 536 663 | 6/2005 |
| EP | 1 742 506 A2 | 1/2007 |
| EP | 1 801 986 | 6/2007 |

(Continued)

OTHER PUBLICATIONS

Specification, claims, abstract & drawings from U.S. Appl. No. 12/266,988 (PS08 0805US1) filed Nov. 7, 2008.

(Continued)

*Primary Examiner*—Henry K Choe
(74) *Attorney, Agent, or Firm*—Renner, Otto, Boisselle & Sklar, LLP

(57) ABSTRACT

A circuit arrangement for providing an analog signal is disclosed. The circuit arrangement comprises a biasing resistor; an analog input arrangement; and a signal output, wherein the biasing resistor and the analog input arrangement are connected in series between a supply voltage and a reference voltage, and the signal output is connected such that the alternating voltage over the biasing resistor is provided as an output signal. An electronic apparatus comprising such a circuit arrangement is also disclosed.

8 Claims, 3 Drawing Sheets

FOREIGN PATENT DOCUMENTS

| | | |
|---|---|---|
| EP | 1 906 704 A1 | 4/2008 |
| WO | 99/08638 | 2/1999 |
| WO | 02/056511 | 7/2002 |

OTHER PUBLICATIONS

Specification, claims, abstract & drawings from U.S. Appl. No. 12/267,115 (PS08 1849US1), filed Nov. 7, 2008.
International Search Report for corresponding international application No. PCT/EP2009/053458 dated Oct. 22, 2009.
Written Opinion for corresponding international application No. PCT/EP2009/053458 dated Oct. 22, 2009.
International Search Report for corresponding application No. PCT/EP2009/053456 dated Oct. 29, 2009.
Written Opinion for corresponding application No. PCT/EP2009/053456 dated Oct. 29, 2009.
International Search Report, corresponding to PCT/EP2009/053457, mailed on Sep. 4, 2009.
Written Opinion, corresponding to PCT/EP2009/053457, mailed on Sep. 4, 2009.

* cited by examiner

CIRCUIT ARRANGEMENT FOR PROVIDING AN ANALOG SIGNAL, AND ELECTRONIC APPARATUS

TECHNICAL FIELD

The present invention relates to a circuit arrangement for providing an analog signal, and an electronic apparatus comprising such a circuit arrangement.

BACKGROUND

Input devices, such as microphones or other devices providing an analog signal sensitive to introduced noise, relying on an applied bias voltage may face electromagnetic compatibility problems. Also noise components in the supply voltage may introduce noise. High currents to other parts of a device may give rise to voltage fluctuations, which in the case of microphones, can be discovered in the microphone signal as for example low frequency noise, often called "bumble bee" sound. These effects normally have to be dealt with by well-balanced designs of how wires and components are positioned and circuitry and signal processing for attenuating known noise. U.S. Pat. No. 6,978,029 B1 discloses a condenser microphone apparatus which is used for a radio apparatus and adapted to reduce noise due to radiation of a high frequency signal of a transmitting unit. A series resistor is provided between a drain and a source of an field effect transistor and a microphone output transmission line to prevent a high frequency voltage from being increased due to resonance of a bypass capacitor and microphone transmission line.

However, there is a desire to provide an alternative approach to reduce these interfering effects at an input of a signal amplifier receiving the signal from the analog device.

SUMMARY

The present invention is based on the understanding that at least some of the effects occur due to fluctuations in biasing of input devices, both in sense of a provided biasing voltage, but also in sense of a reference voltage, such as ground or an intermediate reference voltage between a positive and a negative voltage level of a power supply. The present invention is also based on the understanding that provision of the analog signal output to an amplifier, taken over the high impedance field effect transistor contributes to taking up a considerable amount of the noise, while an analog signal taken over a series resistor, which is also used for the biasing and having a considerable lower impedance than the arrangement with the analog input and the field effect transistor, reduces the noise component provided to the amplifier.

According to a first aspect, there is provided a circuit arrangement for providing an analog signal. The circuit arrangement comprises a biasing resistor; an analog input arrangement; and a signal output, wherein the biasing resistor and the analog input arrangement are connected in series between a supply voltage and a reference voltage, and the signal output is connected such that the alternating voltage over the biasing resistor is provided as an output signal.

The analog input arrangement may comprise a field effect transistor having its drain and source connected to terminals of the analog input arrangement; and a capacitive sensor connected between gate and source of the field effect transistor. The capacitive sensor may be any of a condenser microphone, a microelectromechanical system sensor, and a liquid capacitive inclinometer. The capacitive sensor may be substituted by an electronic circuit or device providing input over the gate and source of the field effect transistor.

The circuit arrangement may further comprise a transistor connected between the biasing resistor and the analog input arrangement with the collector of the transistor connected to the biasing resistor, the emitter of the transistor connected to the analog input arrangement, and the base connected to a voltage for providing a bias point such that a signal swing of the output signal at the connection to the biasing resistor is provided.

The reference voltage may be ground and the supply voltage may be a negative voltage, and the biasing resistor may be connected to the reference voltage and the analog input arrangement may be connected to the supply voltage.

The reference voltage may be ground and the supply voltage may be a positive voltage, and the biasing resistor may be connected to the supply voltage and the analog input arrangement may be connected to the reference voltage.

The signal output may comprise connections to respective terminals of the biasing resistor, and at least one of the connections may comprise a capacitor for alternating current coupling of the output signal.

According to a second aspect, there is provided an electronic apparatus comprising a circuit arrangement according to the first aspect.

The electronic apparatus may be any of a headset, a communication apparatus, and a user interaction device, or any combination thereof.

DETAILED DESCRIPTION

Figure 1:
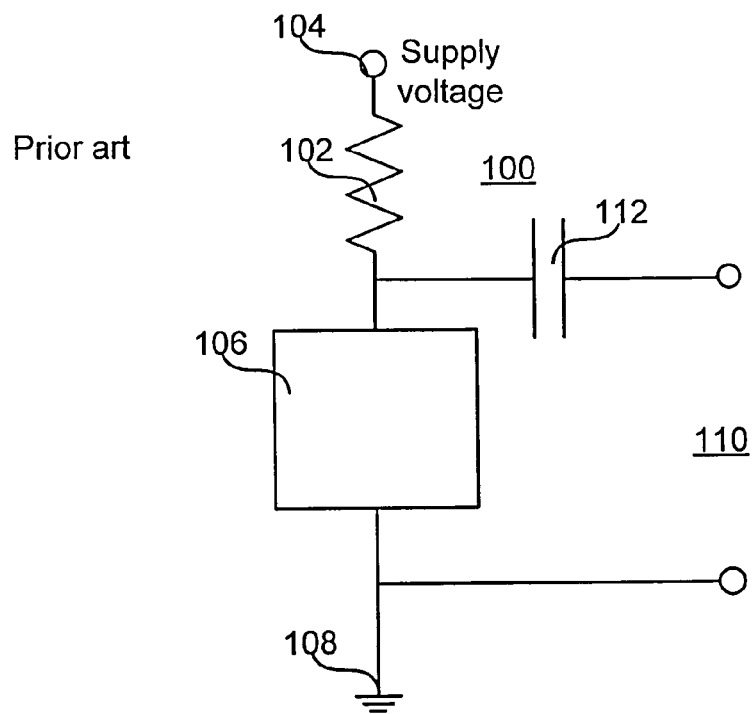
FIG. 1 is a diagram schematically illustrating a circuit arrangement with an analog input arrangement and a biasing arrangement according to prior art.

FIG. 1, which is provided for facilitating understanding of the principles of the invention, is a diagram schematically illustrating a circuit arrangement 100 with biasing arrangement 102 according to prior art. The biasing arrangement 102 comprises a biasing resistor connected to a supply voltage 104 and to an analog input arrangement 106. The analog input arrangement 106 is connected to a reference voltage 108, e.g. ground, such that the biasing arrangement 102 and the analog input arrangement 106 are connected in series between the supply voltage 104 and the reference voltage 108. The signal over the analog input arrangement 106 is connected by a signal output 110 to provide an output signal from the circuit arrangement 100. The signal output 110 preferably comprises a capacitor 112 for alternating current (AC) coupling of the output signal.

Any unwanted AC components of the supply voltage 104, which ideally should have pure direct current (DC) properties, will propagate through the series coupling 102, 106 and the signal output 110 and add noise to the output signal.

Figure 2:
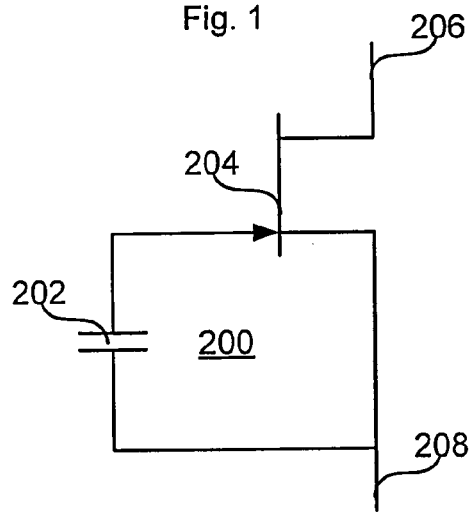
FIG. 2 is a diagram schematically illustrating an exemplary analog input arrangement with an analog input and a field effect transistor.

FIG. 2 is a diagram schematically illustrating an exemplary analog input arrangement 200 with an analog input 202 and a field effect transistor (FET) 204. The FET has its drain and source connected to terminals 206, 208 of the analog input arrangement 200. The analog input 202 is preferably a capacitive sensor connected between gate and source of the FET 204. The capacitive sensor can for example be a condenser microphone, a microelectromechanical system sensor, or a liquid capacitive inclinometer. Upon registration of a physical phenomenon, such as sound, force or inclination, the capacitance of the analog input 202 changes. Thus, an applied charge, which is provided by the biasing arrangement as demonstrated above, on the analog input 202 causes the voltage over the analog input 202 to change. The analog input 202 can also be an electronic circuit or device providing input over the gate and source of the field effect transistor.

Figure 3:
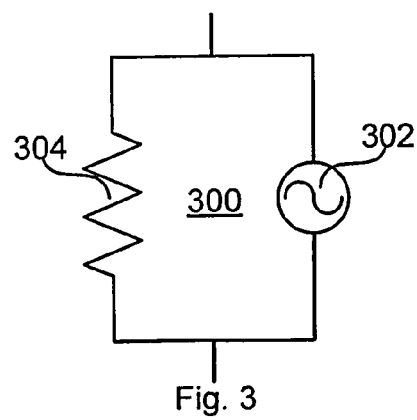
FIG. 3 is a diagram schematically illustrating an equivalent circuit to the arrangement with the analog input and the field effect transistor.

FIG. 3 is a diagram schematically illustrating an equivalent circuit 300 to the analog input arrangement 200 discussed with reference to FIG. 2. The analog input arrangement 200 can be seen as a current source 302 having very high signal impedance 304, which is normally much higher than a biasing resistor. If applied in a circuit arrangement as illustrated in FIG. 1, most of the noise of the supply voltage will be present over this equivalent high signal impedance 304.

Figure 4:
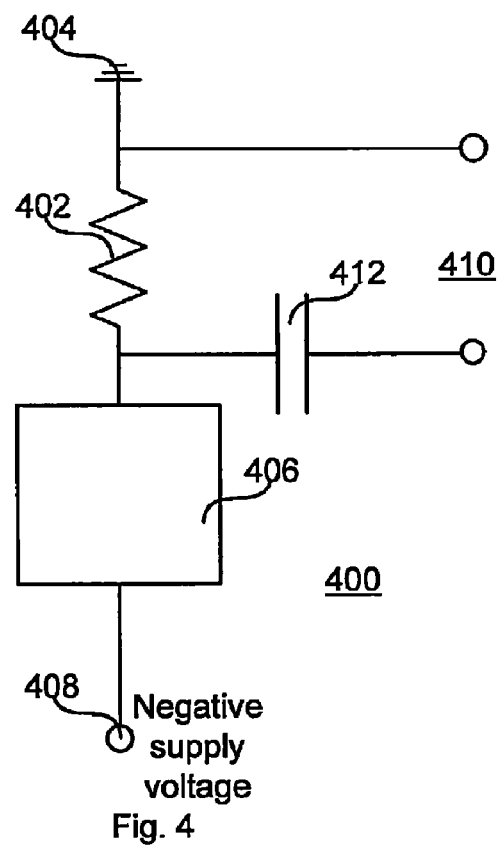
FIG. 4 is a diagram schematically illustrating an analog input arrangement with biasing arrangement according to an embodiment.

FIG. 4 is a diagram schematically illustrating a circuit arrangement 400 according to an embodiment. The circuit arrangement 400 comprises a biasing arrangement 402. The biasing arrangement 402 comprises a biasing resistor connected to a reference voltage 404, e.g. ground, and to an analog input arrangement 406. The analog input arrangement 406 is connected to a supply voltage 408, which preferably have a lower voltage than the reference voltage 404, e.g. a negative voltage if the reference voltage is ground, such that the biasing arrangement 402 and the analog input arrangement 406 are connected in series between the reference voltage 404 and the supply voltage 408. The signal over the biasing resistor 402 is connected by a signal output 410 to provide an output signal from the circuit arrangement 400. The signal output 410 preferably comprises a capacitor 412 for AC coupling of the output signal. The analog input arrangement 406 is preferably according to any of the examples described with reference to FIG. 2.

The configuration of FIG. 4 implies that inherent properties of the analog input arrangement 406, as demonstrated with reference to FIG. 3, provides for a rejection of noise present in the supply voltage 408. A noise rejection of typically 26 dB can be achieved. A substantive common mode rejection can also be achieved.

Figure 5:
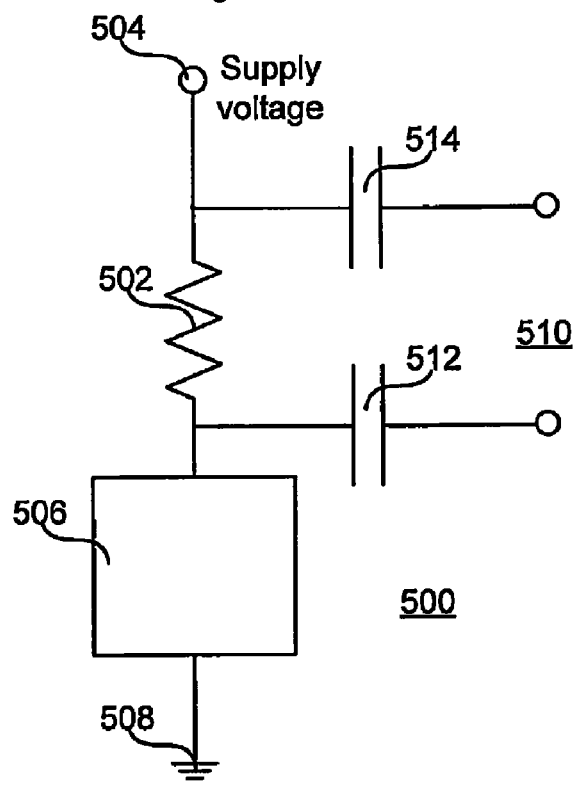
FIG. 5 is a diagram schematically illustrating an analog input arrangement with biasing arrangement according to an embodiment.

FIG. 5 is a diagram schematically illustrating a circuit arrangement 500 according to an embodiment. The circuit arrangement 500 comprises a biasing arrangement 502. The biasing arrangement 502 comprises a biasing resistor connected to a supply voltage 504, and to an analog input arrangement 506. The analog input arrangement 506 is connected to a reference voltage 508, e.g. ground, which preferably have a lower voltage than the supply voltage 504, such that the biasing arrangement 502 and the analog input arrangement 506 are connected in series between the supply voltage 504 and the reference voltage 508. The signal over the biasing resistor 502 is connected by a signal output 510 to provide an output signal from the circuit arrangement 500. The signal output 510 preferably comprises capacitors 512, 514 for AC coupling of the output signal. The analog input arrangement 506 is preferably according to any of the examples described with reference to FIG. 2.

The configuration of FIG. 5 implies that inherent properties of the analog input arrangement 506, as demonstrated with reference to FIG. 3, provides for a rejection of noise present in the supply voltage 504 since only a minor part is present over the biasing resistor 502 since it has much lower impedance compared to the impedance of the analog input arrangement 506. A similar effect as the one demonstrated for the circuit arrangement 400 of FIG. 4 is achieved.

For any of the configurations demonstrated with reference to FIGS. 4 and 5, an effect is achieved by getting the signal over a biasing resistor. However, similar effect can be achieved by configurations giving equal electrical properties, such as arranging voltages as a positive and a negative supply voltage, changing positions of any component, substituting a component with another having similar properties, or adding elements for tuning of the circuit. The biasing arrangement 402, 502 need not be arranged in the same device as the analog input arrangement 406, 506 if they are used in connected and interacting devices, such as a headset connected to a mobile phone.

Figure 6:
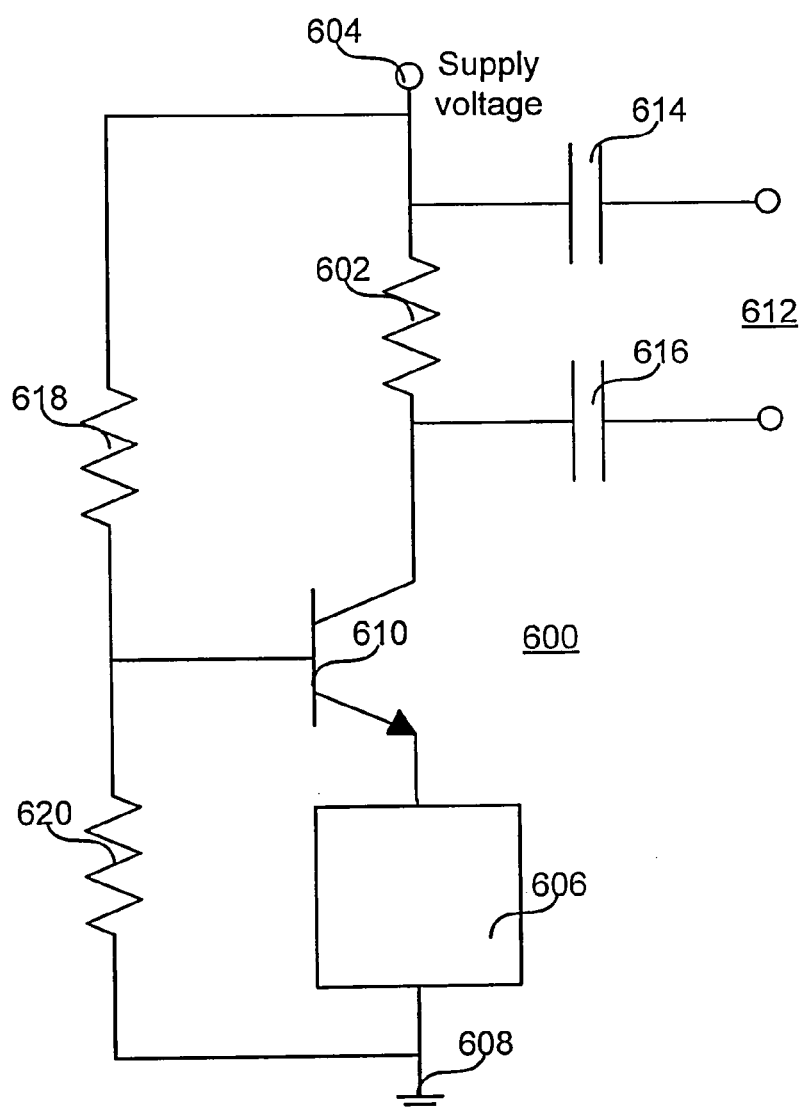
FIG. 6 is a diagram schematically illustrating an analog input arrangement with biasing arrangement according to an embodiment.

FIG. 6 is a diagram schematically illustrating a circuit arrangement 600 according to an embodiment. Here it should be noted that the illustrated example is based on the configuration of FIG. 5, but with additional features. However, similar example with the additional features is equally feasible if based on the configuration of FIG. 4. The circuit arrangement 600 comprises a biasing arrangement 602. The biasing arrangement 602 comprises a biasing resistor connected to a supply voltage 604. An analog input arrangement 606 is connected to a reference voltage 608, e.g. ground, which preferably have a lower voltage than the supply voltage 604. A transistor 610 is connected between the biasing resistor 602 and the analog input arrangement 606 with the collector of the transistor 610 connected to the biasing resistor 602, the emitter of the transistor connected to the analog input arrangement 606, such that the biasing arrangement 602, the transistor 610 and the analog input arrangement 606 are connected in series between the supply voltage 604 and the reference voltage 608. The signal over the biasing resistor 602 is connected by a signal output 612 to provide an output signal from the circuit arrangement 600. The signal output 610 preferably comprises capacitors 614, 616 for AC coupling of the output signal. The analog input arrangement 606 is preferably according to any of the examples described with reference to FIG. 2. The base of the transistor 610 is connected to a voltage, e.g. provided by a voltage divider 618, 620, for providing a bias point such that a signal swing of the output signal at the connection to the biasing resistor 602 is provided.

In the configuration of FIG. 6, considering the configuration of the analog input arrangement 200 demonstrated with reference to FIG. 2, the transistor 610 and the FET 204 will be in cascode, which has been found to be beneficial. The signal of the analog input arrangement 606 is no longer superposed on its driving voltage. If the base of the transistor 610 is properly connected to a low impedance 620, the transistor 610 will work as an emitter follower, which has low impedance at its emitter, which provides the driving voltage to the analog input arrangement 606. The signal from the analog input arrangement 606 will be present at the collector of the transistor 610, and by the properly applied voltage to the base, the collector will swing to provide the output signal over the biasing resistor 602. The voltage to the base of the transistor

610 can be controlled to achieve further effects, such as adapting sensitivity of the analog input arrangement. In the illustration of FIG. 6, the transistor 610 is a bipolar npn transistor, which is particularly beneficial since it provides low output impedance and good control properties regarding voltage applied on the base. However, if high power is to be output or for other reasons, a more robust transistor or another suitable active device such as a MOSFET can be used.

Figure 7:
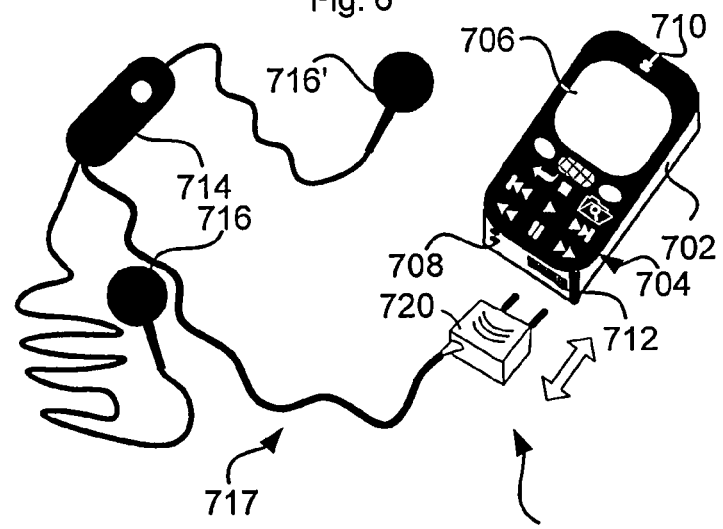
FIG. 7 illustrates an apparatus according to an embodiment.

FIG. 7 illustrates an electronic apparatus 700 according to an embodiment, where the principles of the invention are applicable. The electronic apparatus 700 can for example be a mobile phone or a media player/recorder. The apparatus 700 comprises a main body 702 having power source, circuitry, user interface, etc. The user interface can comprise a keypad 704, a display 706, an analog input arrangement 708, such as a microphone or other sensor, and a speaker 710. The apparatus can also comprise a connector 712 to which an external analog input arrangement 714, such as a microphone or other sensor, and external speakers 716, 716', e.g. forming a headset 718, can be connected by a connector 720 of the headset 718. The connectors 712, 720 are arranged to mate each other and provide electrical contacts between the main body circuitry and the input and output devices 714, 716, 716' of the headset 718 for input and output of signals.

The invention claimed is:

1. A circuit arrangement for providing an analog signal, the circuit arrangement comprising
    a biasing resistor;
    an analog input arrangement; and
    a signal output,
    wherein the biasing resistor and the analog input arrangement are connected in series between a supply voltage and a reference voltage, and
    the signal output is connected such that the alternating voltage over the biasing resistor is provided as an output signal,
    wherein the analog input arrangement comprises
        a field effect transistor having its drain and source connected to terminals of the analog input arrangement; and
        a capacitive sensor connected between gate and source of the field effect transistor.

2. The circuit arrangement according to claim 1, wherein the capacitive sensor is any of a condenser microphone, a microelectromechanical system sensor, and a liquid capacitive inclinometer.

3. The circuit arrangement according to claim 1, further comprising a transistor connected between the biasing resistor and the analog input arrangement with the collector of the transistor connected to the biasing resistor, the emitter of the transistor connected to the analog input arrangement, and the base connected to a voltage for providing a bias point such that a signal swing of the output signal at the connection to the biasing resistor is provided.

4. The circuit arrangement according to claim 1, wherein the reference voltage is ground and the supply voltage is a negative voltage, and the biasing resistor is connected to the reference voltage and the analog input arrangement is connected to the supply voltage.

5. The circuit arrangement according to claim 1, wherein the reference voltage is ground and the supply voltage is a positive voltage, and the biasing resistor is connected to the supply voltage and the analog input arrangement is connected to the reference voltage.

6. The circuit arrangement according to claim 1, wherein the signal output comprises connections to respective terminals of the biasing resistor, and at least one of the connections comprises a capacitor for alternating current coupling of the output signal.

7. An electronic apparatus comprising a circuit arrangement according to claim 1.

8. The electronic apparatus according to claim 7, being any of a headset, a communication apparatus, and a user interaction device, or any combination thereof.

* * * * *